LAMINATED LAYER FERROMAGNETIC MEMORY
AND LOGICAL CIRCUIT ELEMENTS
Filed April 12, 1967

United States Patent Office 3,518,641
Patented June 30, 1970

3,518,641

LAMINATED LAYER FERROMAGNETIC MEMORY AND LOGICAL CIRCUIT ELEMENTS

Victor Chaptal de Chanteloup, Paris, France, assignor to CSF-Compagnie Generale de Telegraphie Sans Fil, a corporation of France Filed Apr. 12, 1967, Ser. No. 630,363
Claims priority, application France, Apr. 19, 1966, 58,142
Int. Cl. G11c *11/12*
U.S. Cl. 340—174 1 Claim

ABSTRACT OF THE DISCLOSURE

Ferromagnetic element comprising a laminated structure made of alternating dielectric and ferromagnetic layers, and at least two holes forming a leg, around which are wound the control wires.

The present invention relates to the use of thin, laminated ferromagnetic layers for building up memory elements or elements of magnetic logical circuits.

The formation of thin, laminated ferromagnetic layers by the alternating evaporation of an insulator, such as silicon oxide, and a ferromagnetic alloy, such as, for example, a ferro-nickel alloy, has been described by F. J. Friedlaender and L. F. Silva, in a paper entitled "Wall Transition in Coupled Films," and published in the "Journal of Applied Physics" of March 1965 (vol. 36, No. 3, part 2).

Such a laminated assembly of thin layers is equivalent to one layer having a greater thickness. If the lines of force close in the air, substantial amounts of magnetic energy are needed to store information.

It is an object of the invention to avoid this drawback.

According to the invention, there is provided a ferromagnetic memory or logic element comprising a laminated structure comprising alternating dielectric and ferromagnetic layers, said structure having at least two holes and a leg between said two holes, and at least one wire wound around said leg.

For a better understanding of the invention and to show how the same may be carried into effect reference will be made to the drawings accompanying the following description and in which:

FIG. 1 shows the drawbacks of thin magnetic films used for forming open magnetic circuits in memories of known construction, in which the information is represented by the direction of the magnetization of a wafer or of a part of a continuous plane.

Figure 1:
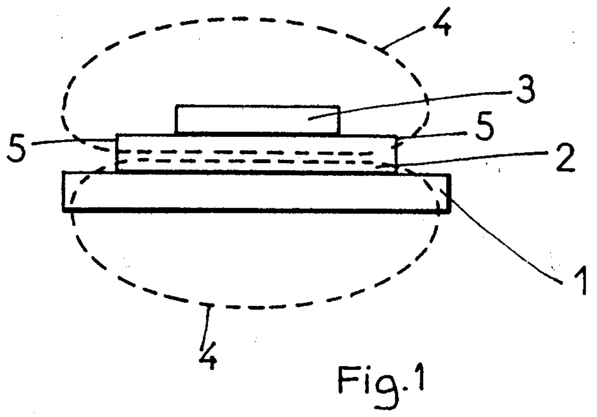
FIG. 1 shows a thin film magnetic memory element of known type.

The memory element of FIG. 1 consists of a substratum or base 1, on which has been deposited a thin magnetic film 2, forming an open magnetic circuit and supporting a conductor 3.

The flux 4, generated by a current flowing through the conductor 3, traverses the magnetic film 2 and closes in the air.

The current flowing in the conductor 3 gives rise to magnetic charges at each end 5 of the film 2.

In the device of FIG. 1, the lines of force close through the air. Within the film 2 a demagnetizing field, due to magnetic charges appearing at the ends 5 of the film 2 limits the field within the film. If a stack of films such as film 2 were used, this would result in an increase of the demagnetizing field .The energy needed for storing information would be all the greater.

Figures 2, 3:
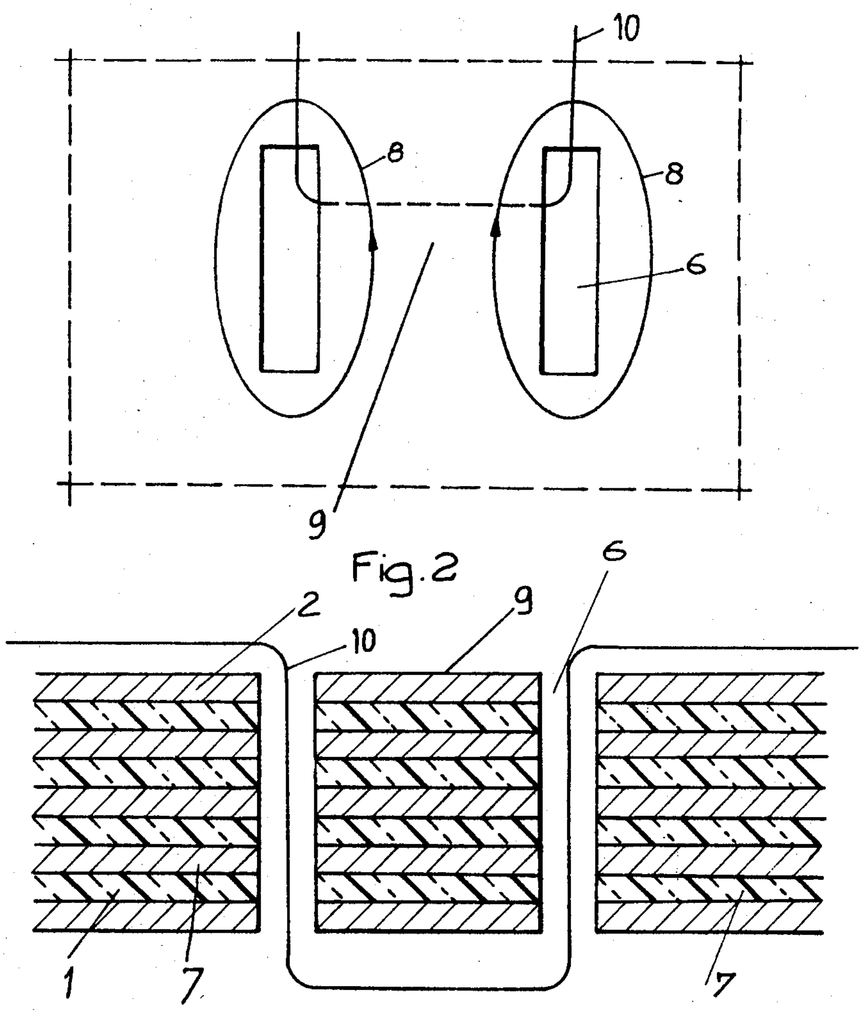
FIG. 2 shows a plan view of an embodiment of a magnetic memory element, formed by a closed magnetic circuit according to the invention.
FIG. 3 shows the embodiment of FIG. 2 in section.

This drawback is avoided in the structure shown in FIGS. 2 and 3.

FIGS. 2 and 3 show an embodiment of a magnetic structure with closed flux according to the invention, formed by a stacking of ferromagnetic layers, separated by insulating layers.

This magnetic circuit is formed by two holes 6, formed in alternating layers of ferromagnetic alloy and insulating material, for example, silicon oxide. These two holes define a leg 9 which carries, for example, a coil 10.

The flux 8 passing through this leg 9 is closed in the laminated assembly 7.

The utilization according to the invention of thin ferromagnetic layers with a thickness of less than 400 A., obtained by alternating evaporation of insulator and ferromagnetic alloy, makes it possible to increase the effective thickness of the magnetic circuit, that is, of one of its transverse dimensions. This increase in the effective thickness causes the rise of the output voltage appearing across the terminals of a coil, such as 10. This voltage is substantially proportional to the number of layers.

The structure according to the invention may also be used as magnetic logical elements. It is known that in such circuits, the use of thin magnetic layers results in low output voltages across the terminals of coils placed on the magnetic circuits. The connections between windings of different logical circuits can have low resistances, that is to say, they may be short and formed by thick conductors. The use of laminated layers makes it possible to multiply the value of the output voltage by the number $n$ of the used ferromagnetic layers. Another advantage is that the connections between logical circuits, may be $n$ times more resistant.

What is claimed is:

1. A ferromagnetic memory or logic element comprising a laminated structure comprising alternating dielectric and ferromagnetic layers, said structure having at least two holes pierced throughout said structure, in a direction perpendicular to said layers, a leg between said two holes, and at least one wire wound around said leg.

References Cited

UNITED STATES PATENTS

| | | | |
|---|---|---|---|
| 3,210,707 | 10/1965 | Constantakes | 336—200 |
| 3,305,845 | 2/1967 | Grace et al. | 340—174 |
| 3,353,169 | 11/1967 | Halverson | 340—174 |
| 3,382,491 | 5/1968 | Bergman | 340—174 |

STANLEY M. URYNOWICZ, Jr., Primary Examiner